(12) United States Patent
Fujino et al.

(10) Patent No.: US 7,994,745 B2
(45) Date of Patent: Aug. 9, 2011

(54) POWER SUPPLY DEVICE FOR VEHICLES

(75) Inventors: Takeshi Fujino, Wako (JP); Mitsuaki Hirakawa, Wako (JP); Minoru Noguchi, Wako (JP); Eisuke Komazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 547 days.

(21) Appl. No.: 12/222,034

(22) Filed: Jul. 31, 2008

(65) Prior Publication Data

US 2009/0039815 A1 Feb. 12, 2009

(30) Foreign Application Priority Data

Aug. 6, 2007 (JP) ................. 2007-204768

(51) Int. Cl.
*H02P 3/14* (2006.01)
(52) U.S. Cl. .................... 318/376; 318/400.38; 318/139
(58) Field of Classification Search .................. 318/376, 318/400.38, 400.32, 434, 440, 139, 400.3, 318/148; 180/65.29; 320/132
See application file for complete search history.

(56) References Cited

U.S. PATENT DOCUMENTS

2009/0092867 A1* 4/2009 Suzuki et al. ................... 429/13

FOREIGN PATENT DOCUMENTS

| JP | 6-292305 A | 10/1994 |
|---|---|---|
| JP | 2006-059685 A | 3/2006 |
| JP | 2006-059689 | 3/2006 |
| JP | 2006-353033 | 12/2006 |
| JP | 2007-012414 A | 1/2007 |
| JP | 2007-185074 A | 7/2007 |
| WO | 2007/066531 A1 | 6/2007 |

OTHER PUBLICATIONS

Japanese Office Action application No. 2007-204768 dated Mar. 1, 2011.

* cited by examiner

*Primary Examiner* — Karen Masih
(74) *Attorney, Agent, or Firm* — Squire, Sanders & Dempsey (US) LLP

(57) ABSTRACT

A power supply device for vehicles, output units (10a, 10b) thereof are connected to a motor (5), includes a fuel cell (1) which is connected to the output units (10a, 10b), a capacitor (2) which is connected in parallel to the fuel cell (1), a lithium ion battery (21) which is connected in parallel to the capacitor (2) through a DC/DC converter (20), and a current control means (32) which limits an output current of the lithium ion battery (21) to at most an output upper-limit current (Ibout_lmt) when power is supplied to the motor (5) from the lithium ion battery (21) during a power running operation of the motor (5), and limits an input current into the lithium ion battery (21) to at most an input upper-limit current smaller than the output upper-limit current (Ibin_lmt) through the DC/DC converter (20) when regenerative power of the motor (5) is recovered into the lithium ion battery (21) during a regenerative operation of the motor (5).

4 Claims, 5 Drawing Sheets

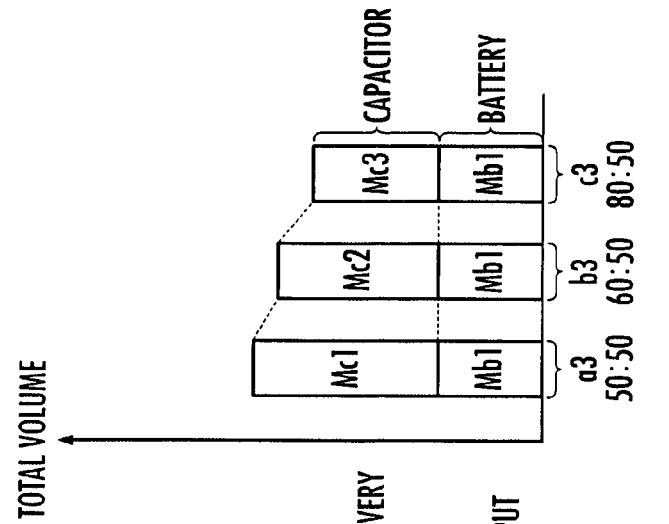
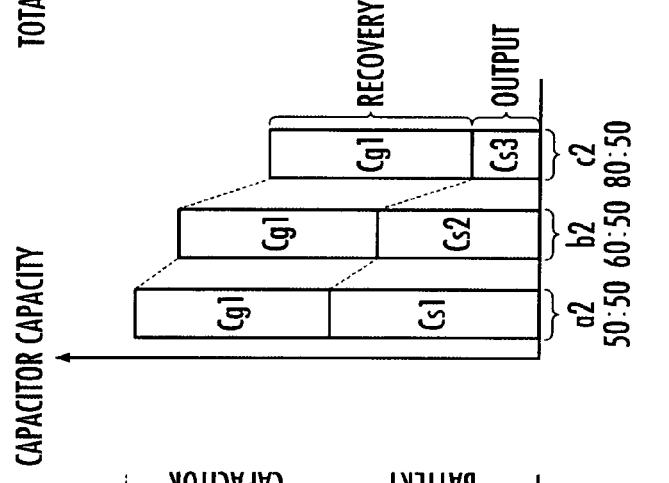
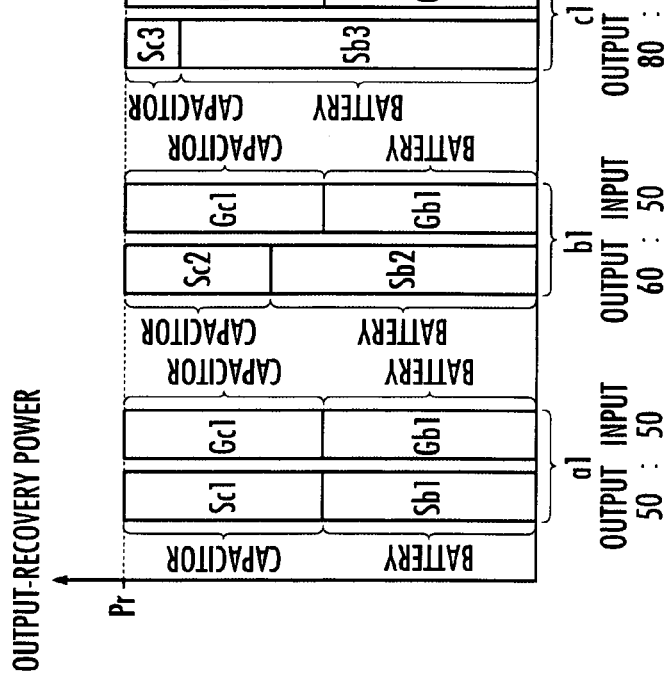

POWER SUPPLY DEVICE FOR VEHICLES

BACKGROUND OF THE INVENTION

1. Field of the Invention

The present invention relates to a power supply device for vehicles, which is mounted on a vehicle, has an output unit connected to a motor which is rotated with a drive wheel, supplies drive power to the motor during a power running operation of the motor, and recovers regenerative power of the motor during a regenerative operation of the motor.

2. Description of the Related Art

Conventionally, a power supply device for vehicles, in which a fuel cell and a capacitor are connected in parallel to a drive motor and a secondary battery is connected in parallel to the fuel cell and the capacitor through a DC/DC converter, is known as a drive source of a fuel cell vehicle (for example, refer to Japanese Unexamined Patent Application Publication No. 2006-59689 (pages 4 to 5 and FIG. 1)).

In the conventional power supply device for vehicles, during a power running operation of the motor, an output voltage of the secondary battery is set by the DC/DC converter such that the capacitor is discharged preferentially to the fuel cell and the secondary battery. Further, during a regenerative operation of the motor, an output voltage to the secondary battery is set by the DC/DC converter such that the capacitor is charged preferentially to the secondary battery.

Further, there is provided an electric vehicle in which drive power is supplied to a motor from a battery during a power running operation of the motor and a secondary battery is charged with regenerative power generated during a regenerative operation of the motor (for example, refer to Japanese Unexamined Patent Application Publication No. 2006-353033 (page 7 and FIGS. 4 and 5)). In the electric vehicle, limit values of output and input currents of the battery are determined on the basis of the temperature and remaining charging capacity of the secondary battery. Further, as the limit values of the output and input currents of the secondary battery are set in such a manner, it is possible to prevent the deterioration of the secondary battery.

However, in the above-mentioned electric vehicle 1, as the output current of the secondary battery is limited, the output of the motor is also limited. Therefore, the travel performance of the electric vehicle is degraded. Further, as the input current of the secondary battery is limited, the current at the time of recovering the regenerative power of the motor into the secondary battery decreases. Therefore, the overall regenerative power of the motor cannot be recovered, and the recovery rate of the regenerative power decreases.

Further, to prevent the degradation of the travel performance of the electric vehicle and the decrease in the recovery rate of the regenerative power, it is considered that the capacity of the secondary battery is increased. In this case, however, the volume of the secondary battery increases, so that the mounting space thereof expands. Further, the cost of the secondary battery increases.

SUMMARY OF THE INVENTION

The present invention has been accomplished in view of the aforementioned problems, and an object of the invention is to provide a power supply device for vehicles, which can prevent defects caused by limiting input and output currents of a secondary battery, thereby reducing the deterioration of the secondary battery.

According to an aspect of the invention, there is provided a power supply device for vehicles, which is mounted on a vehicle, has an output unit connected to a motor which is rotated with a drive wheel, supplies drive power to the motor during a power running operation of the motor, and recovers regenerative power of the motor during a regenerative operation of the motor.

The power supply device includes a fuel cell which is connected to the output unit; a capacitor which is connected in parallel to the fuel cell; a secondary battery which is connected in parallel to the capacitor through a current limiting means; a current control means which limits an output current of the secondary battery to at most a discharge limit current, when power is supplied to the motor from the secondary battery during the power running operation of the motor; and limits a current, which is charged into the secondary battery, to at most a charge limit current smaller than the discharge limit current through the current limiting means, when the regenerative power of the motor is recovered into the secondary battery during the regenerative operation of the motor.

In the power supply device for vehicles, during the power running operation of the motor, the current control means limits the current, which is output from the secondary battery to the motor, to at most the discharge limit current. During the regenerative operation of the motor, the current control means limits the current, which is input to the secondary battery from the motor, to at most the charge limit current smaller than the discharge limit current. Accordingly, during the power running operation of the motor, it is possible to prevent the insufficient power supply from secondary battery to the motor. Further, during the regenerative operation of the motor, it is possible to prevent an increase in inter-terminal voltage of the secondary battery caused by the internal resistance of the secondary battery which increases as the charging current increases.

Further, as the inter-terminal voltage of the secondary battery when the secondary battery is charged is prevented from increasing, the secondary battery can be substantially fully charged while being prevented from being deteriorated due to overcharge. Accordingly, since the output of the secondary battery can be increased during the power running operation of the motor, power which needs to be output from the capacitor can be reduced as much as the increase of the output of the secondary battery, which makes it possible to reduce the capacity of the capacitor. Further, when the input current of the secondary battery is reduced, an input current at the time of recovering the regenerative power of the motor through secondary battery decreases, but the regenerative power can be recovered into the capacitor connected in parallel to the secondary battery, which makes it possible to effectively use the regenerative power of the motor without loss.

The power supply device further includes a temperature detecting means which detects the temperature of the secondary battery. As the temperature of the secondary battery increases, the current limiting means reduces a ratio of the input upper-limit current with respect to the output upper-limit current.

According to the present invention, when the temperature of the secondary battery increases, the secondary battery is activated, and a current which can be extracted increases accordingly. Therefore, the output upper-limit current can be increased. However, as the temperature of the secondary battery increases, the internal resistance of the secondary battery decreases, making the crystal structure of a positive electrode within the secondary battery unstable. Therefore, when the input upper-limit current is increased at the same ratio as the output upper-limit current, deterioration reaction easily occurs on the crystal surface of the positive electrode of the secondary battery, especially during the charging of the secondary battery. Accordingly, as the temperature of the secondary battery is high, the current control means reduces a ratio of the discharge limit current with respect to the charge limit current. Then, when the temperature of the secondary battery increases, an increase in the input upper-limit current is prevented. Further, during the charging, an increase in the inter-terminal voltage of the secondary battery is prevented. Therefore, it is possible to reduce the deterioration of the secondary battery.

The power supply device further includes a fuel cell accessory unit which is connected between the secondary battery and the current limiting means and is driven by power supplied from the secondary battery to operate the fuel cell.

Since the charging amount of the secondary battery is increased by the limitation of the input current to the secondary battery by the current control means, the operation of the fuel cell accessory unit can be prevented from being disabled or destabilized due to the insufficient charging amount of the secondary battery.

BRIEF DESCRIPTION OF THE DRAWINGS

FIG. 5 is a diagram for explaining an effect obtained by making the input upper-limit current smaller than the output upper-limit current.

DESCRIPTION OF THE PREFERRED EMBODIMENTS

Figure 1:
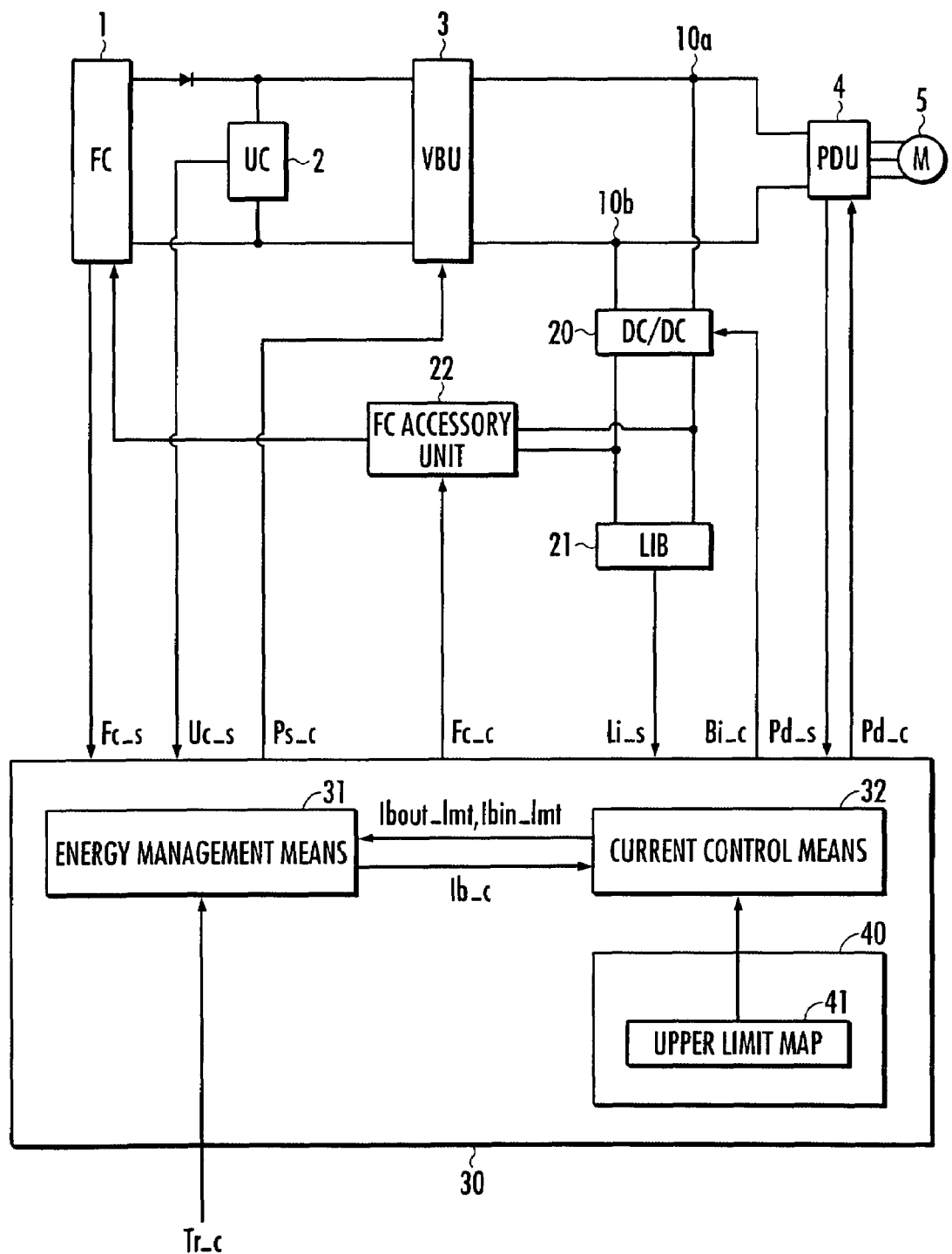
FIG. 1 is a diagram showing the entire configuration of a power supply device for vehicles according to an embodiment of the invention.
Figure 2:
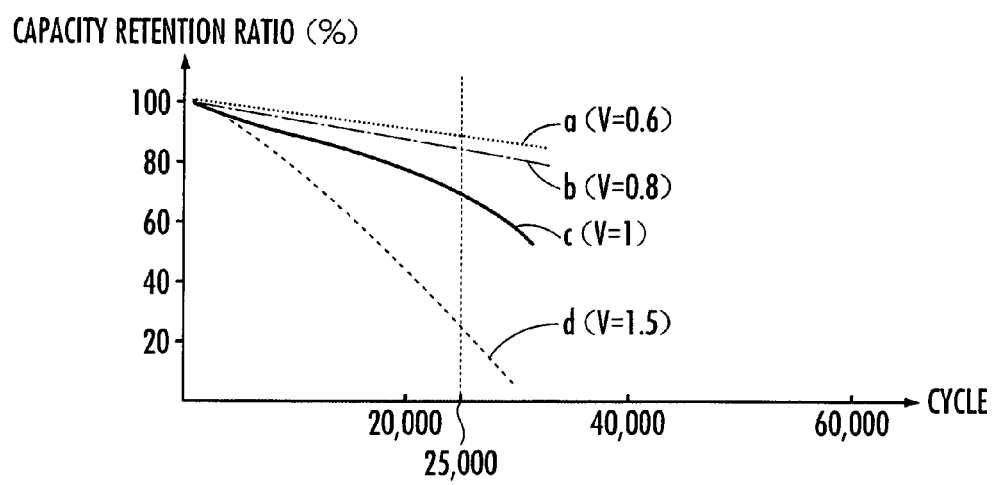
FIGS. 2(a) and 2(b) are diagrams for explaining the relationship between a ratio V of input upper-limit current to output upper-limit current and the progress of deterioration of a lithium ion battery.
Figure 2:
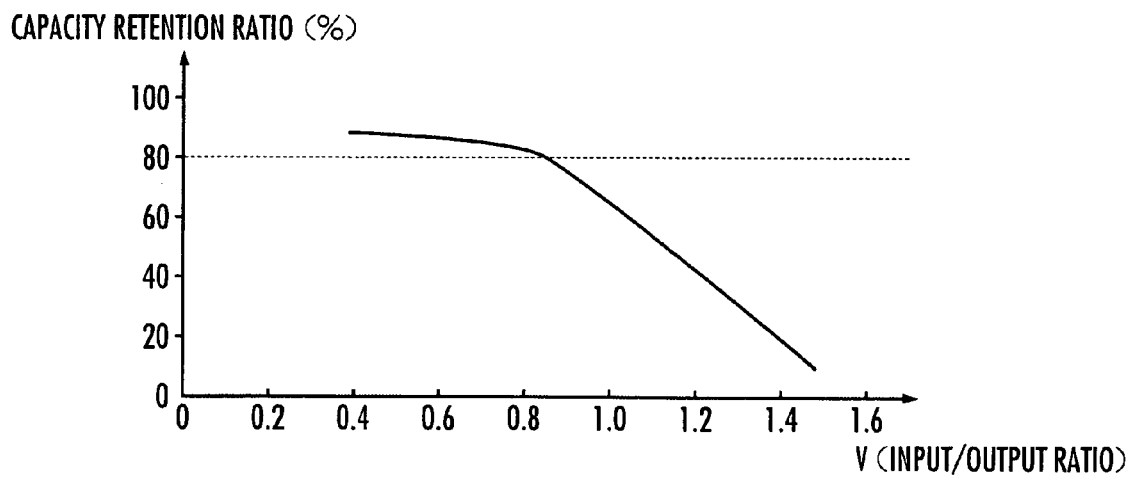
Figure 3:
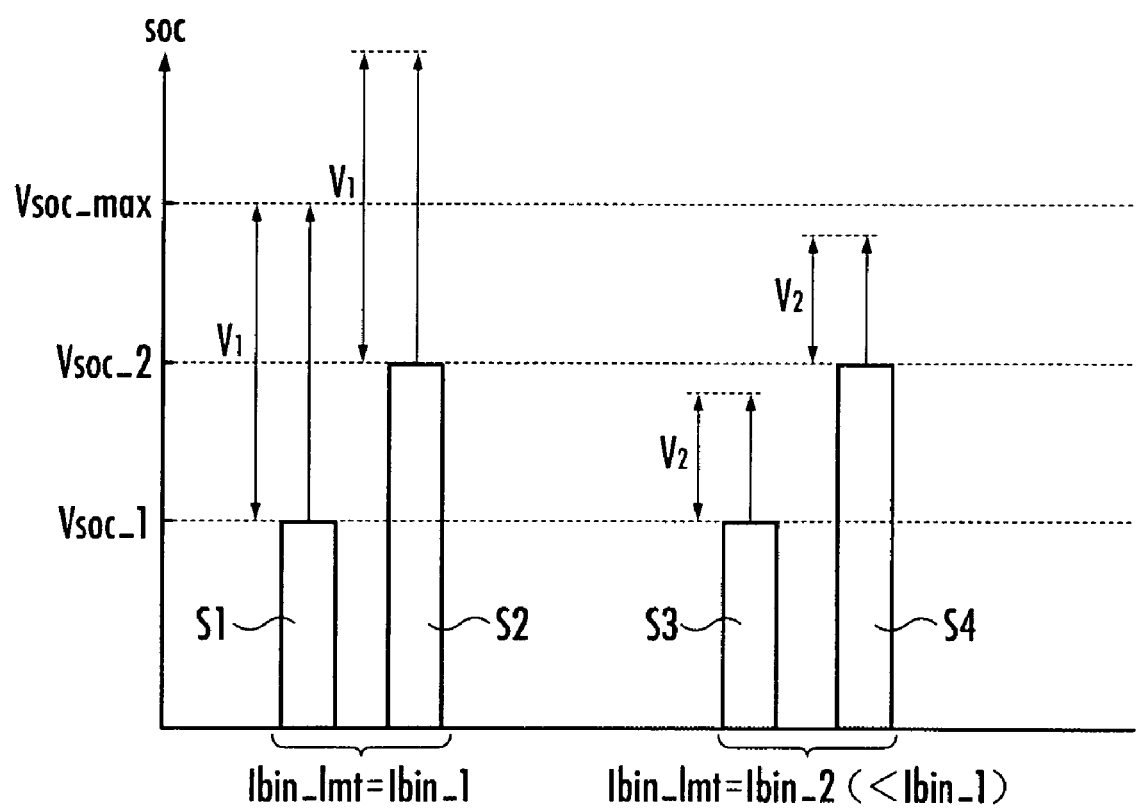
FIG. 3 is a diagram for explaining a difference in charging amount of the lithium ion battery depending on the setting of the input upper-limit current.
Figure 4:
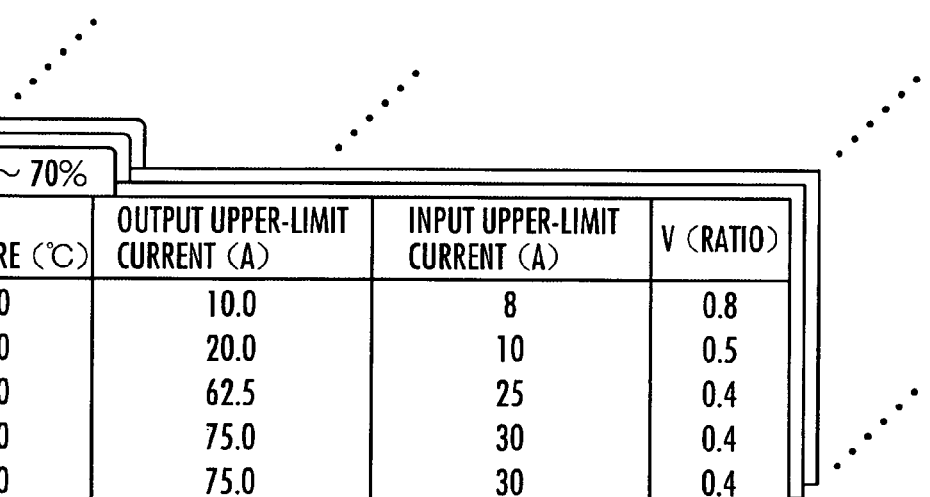
FIG. 4 is a diagram for explaining an upper-limit map which allocates the output upper-limit current and the input upper-limit current with respect to the SOC (State of Charge) and temperature of the lithium ion battery.

Hereinafter, a power supply device for vehicles according to an embodiment of the present invention will be described with reference to FIGS. 1 to 5. FIG. 1 is a diagram showing the entire configuration of a power supply device for vehicles according to an embodiment of the invention. FIGS. 2(a) and 2(b) are diagrams for explaining the relationship between a ratio V of input upper-limit current to output upper-limit current and the progress of deterioration of a lithium ion battery. FIG. 3 is a diagram for explaining a difference in charging amount of the lithium ion battery depending on the setting of the input upper-limit current. FIG. 4 is a diagram for explaining an upper-limit map which allocates the output upper-limit current and the input upper-limit current with respect to the SOC (State Of Charge) and temperature of the lithium ion battery. FIG. 5 is a diagram for explaining an effect obtained by making the input upper-limit current smaller than the output upper-limit current.

Referring to FIG. 1, the power supply device for vehicles according to this embodiment is mounted on a fuel cell vehicle (corresponding to a vehicle of the present invention). The power supply device for vehicles includes a fuel cell 1, an electrical double layer capacitor 2 (hereinafter, referred to as a capacitor 2) connected in parallel to the fuel cell 1, a voltage boosting means 3 having an input unit connected to the fuel cell 1 and the capacitor 2 and an output unit connected to a motor 5 through a PDU (Power Drive Unit) 4, a DC/DC converter 20 having an input unit connected to the voltage boosting means 3 and an output unit connected to a lithium battery 21 (corresponding to a secondary battery of the invention), and an FC accessory unit 22 which controls an amount or the like of reaction gas (hydrogen and oxygen) supplied to the fuel cell 1 to adjust the power generation of the fuel cell 1.

The power supply device for vehicles further includes a controller 30 which is an electronic unit composed of a microcomputer (not shown) and so on and controls the overall operations of the power supply device. By executing in the microcomputer a program for controlling the power supply device, the controller 30 functions as an energy management means 31 and a current control means 32. The energy management means 31 performs power supply management on the fuel cell 1, the capacitor 2, and the lithium battery 21 and power recovery management on the capacitor 2 and the lithium battery 21. The current control means 32 limits output and input currents of the lithium battery 21 through the DC/DC converter 20.

The controller 30 includes a memory 40 storing data of an upper limit map 41 which determines an output upper-limit current Ibout_lmt and an input upper-limit current Ibin_lmt with respect to the temperature and SOC of the lithium ion battery 21. The output upper-limit current Ibout_lmt is a limit value of output current of the lithium ion battery 21, and the input upper-limit current Ibin_lmt is a limit value of input current of the lithium ion battery 21.

The controller 30 receives detection signals Fc_s (detection signals for the temperature, output voltage/current, and supply pressure of reaction gas of the fuel cell 1) by various sensors provided in the fuel cell 1, detection signals Uc_s (detection signals for the temperature, inter-terminal voltage, and input/output currents of the capacitor 2) by various sensors provided in the capacitor 2, detection signals Li_s (detection signals for the temperature, inter-terminal voltage, and input/output currents of the lithium ion battery 21) by various sensors provided in the lithium ion battery 21, and detection signals (detection signals for the current/voltage supplied to the motor 5 and the regenerative current/voltage of the motor 5) by various sensors provided in the PDU 4.

Further, an amount of reaction gas supplied by the FC accessory unit 22 is adjusted according to a control signal Fc_c output from the controller 30, thereby the power generation of the fuel cell 1 is controlled. Further, an output voltage of the boosting means 3 is controlled by a control signal Ps_c. Further, input and output currents of the lithium ion battery 21 are controlled by changing a switching operation on the DC/DC converter 20 according to a control signal Bi_c. Further, the power running torque and regenerative torque of the motor 5 is controlled by adjusting an amount of current carried between the PDU 4 and the motor 5 according to a control signal Pd_c.

The energy management means 31 detects the states of the fuel cell 1, the capacitor 2, and the lithium ion battery 21 from the detection signals Fc_s, Uc_s, and Li_s by various sensors, and determines the maximum power Wmax which can be output totally. Further, based on a target torque Tr_c of the motor 5, which is determined depending on a travel condition (speed, acceleration or the like) of the vehicle or a manipulation state (a manipulation amount or the like of accelerator pedal) by a driver, the power consumption of the FC accessory unit 22, and the power consumption of other electric accessory units (not shown) such as an air-conditioning machine, an audio equipment and so on, the energy management means 31 determines the target power Wc, which is output from the power supply device, in such a range that does not exceeds the maximum power Wmax.

The energy management means 31 determines a ratio, at which the output power of the fuel cell 1, the capacitor 2, and the lithium ion battery 21 is divided, such that the target power Wc is obtained and the total efficiency of the fuel cell 1, the capacitor 2, and the lithium ion battery 21 is optimized (that is, a total internal resistance loss is minimized by weighing an internal resistance loss determined from the power generation efficiency and the humidification state of the fuel cell 1, and an internal resistance loss in which the temperature states of the capacitor 2 and the lithium ion battery 21 are considered).

When the motor 5 performs a regenerative operation, the energy management means 31 determines a distribution ratio at which the regenerative power output from the motor 5 is recovered into the capacitor 2 and the lithium ion battery 21.

The current control means 32 outputs to the energy management means 31 the output upper-limit current Ibout_lmt and the input upper-limit current Ibin_lmt which are determined on the basis of the temperature and SOC of the lithium ion battery 21. Further, during the power running operation of the motor 5, the energy management means 31 determines a current instruction value Ib_c of the lithium ion battery 21 such that the current instruction value Ib_c does not exceeds the output upper-limit current Ibout_lmt. During the regenerative operation of the motor 5, the energy management means 31 determines a current instruction value Ib_c of the lithium ion battery 21 such that the current instruction value Ib_c does not exceed the input upper-limit current Ibin_lmt.

The current control means 32 controls the operation of the DC/DC converter 20 such that the output or input current of the lithium ion battery 21 becomes the current instruction value Ib_c. Accordingly, the output current of the lithium ion battery 21 is limited to at most the output upper-limit current Ibout_lmt, and the input current of the lithium ion battery 21 is limited to at most the input upper-limit current Ibin_lmt.

FIGS. 2(a) and 2(b) show a difference in the progress of deterioration of the lithium ion battery 21, depending on the setting modes of the output upper-limit current Ibout_lmt and the input upper-limit current Ibin_lmt. In FIG. 2(a), the vertical axis is set to a capacity retention ratio of the lithium ion battery 21, and the horizontal axis is set to the number of cycles where a predetermined charge/discharge waveform is applied to the lithium ion battery 21.

The capacity of the lithium ion battery 21 is measured by calculating an integrated value of input currents supplied from a charging current down to 1/20 of the charging current at the beginning of charging, when constant voltage charging under CCCV (Constant Control/Constant voltage) is performed on the lithium ion battery 21. In this case, the initial capacity of the lithium ion battery 21 is set to 100%, and the percentage of the measured capacity of the lithium ion battery 21 when a charging/discharging cycle is repeated is set to the capacity retention ratio.

In FIG. 2(a), "a" indicates a case where an input/output ratio V, which is a ratio of a predetermined output upper-limit current Ibout_lmt to a predetermined input upper-limit current Ibin_lmt (Ibin_lmt/Ibout_lmt), is set to 0.6, "b" indicates a case where the input/output ratio V is set to 0.8, "c" indicates a case where the input/output ratio V is set to 1, and "d" indicates a case where the input/output ratio V is set to 1.5. As shown in FIG. 2(a), it can be found that as the input/output ratio V is large, that is, the input upper-limit current Ibin_lmt is set to be large, the capacity retention ratio of the lithium ion battery 21 decreases, and the deterioration of the lithium ion battery 21 quickens.

FIG. 2(b) shows a case where the number of cycles approaches 25,000 in the graph of FIG. 2(a) (a point of time where it is assumed that the vehicle has been used for 10 years). In FIG. 2(b), the vertical axis is set to the capacity retention ratio of the lithium ion battery 21, and the horizontal axis is set to the input/output ratio V. As shown in FIG. 2(b), it can be found that as the input/output ratio V is set to be more than 0.8, the capacity retention ratio of the lithium ion battery 21 decreases to at most 80%, and the decrement increases. Therefore, the current control means 32 sets the output upper-limit current Ibout_lmt and the input upper-limit current Ibin_lmt such that the input/output value V is at most 0.8.

Further, as the temperature of the lithium ion battery 21 increases, the lithium ion battery 21 become more activated, and a current which can be extracted from the lithium ion battery 21 increases. Therefore, as the temperature of the lithium ion battery 21 is high, the output current of the lithium ion battery 21 can be increased by increasing the output upper-limit Ibout_lmt, thereby enhancing the output performance of the power supply device.

However, as the temperature of the lithium ion battery 21 increases, the internal resistance of the lithium ion battery 21 decreases, and the crystal structure of a positive electrode within the lithium ion battery 21 is destabilized. Therefore, when the input upper-limit current Ibin_lmt is increased and if the output upper-limit current Ibout_lmt is increased at the same ratio as the input upper-limit current Ibin_lmt, the deterioration of the lithium ion battery 21 easily occurs due to an increase in inter-terminal voltage. That is, when the lithium ion battery 21 is charged, deterioration reaction easily occurs on the crystal surface of the positive electrode. Further, the charging allowance until the lithium ion battery 21 is fully charged changes depending on the SOC of the lithium ion battery 21. Therefore, it is preferable to change the output upper-limit current Ibout_lmt and the input upper-limit current Ibin_lmt depending on the SOC.

FIG. 3 is a diagram for explaining the relationship between the SOC of the lithium ion battery 21 and charging currents. In FIG. 3, the vertical axis is set to the SOC of the lithium ion battery 21. Further, a left bar graph indicates a case where when the lithium ion battery 21 is charged in a state where the input upper-limit current Ibin_lmt is set to Ibin_1, the inter-terminal voltage of the lithium ion battery 21 increases, and a right bar graph indicates a case where when the lithium ion battery 21 is charged in a state where the input upper-limit current Ibin_lmt is set to Ibin_2 smaller than Ibin_1, the inter-terminal voltage of the lithium ion battery 21 increases.

In FIG. 3, Vsoc_max represents an inter-terminal voltage when the lithium ion battery 21 is fully charged. When the lithium ion battery 21 is charged in such a manner that the inter-terminal voltage thereof exceeds Vsoc_max, the deterioration of the lithium ion battery 21 becomes serious due to overcharge. Further, when the input upper-limit current Ibin_lmt is set to Ibin_1 and the inter-terminal voltage of the lithium ion battery 21 is Vsoc_1, the inter-terminal voltage of the lithium ion battery 21 does not exceed Vsoc_max, even though a voltage increase $V_1$ by Ibin_1 is added. However, when the inter-terminal voltage of the lithium ion battery 21 is Vsoc_2, and if a voltage increase V1 by Ibin_1 is added, the inter-terminal voltage of the lithium ion battery 21 exceeds Vsoc_max.

Therefore, when the input upper-limit current Ibin_lmt is set to Ibin_1, the charging should be terminated at a point of time where the inter-terminal voltage of the lithium ion battery 21 approaches Vsoc_1, in order to perform the charging in such a range that the inter-terminal voltage of the lithium ion battery 21 does not exceed Vsoc_max.

Meanwhile, as shown by the right bar graph of FIG. 3, when the input upper-limit current Ibin_lmt is set to Ibin_2 smaller than Ibin_1 and the inter-terminal voltage of the lithium ion battery 21 is Vsoc_2, the inter-terminal voltage of the lithium ion battery 21 is not larger than Vsoc_max, even though a voltage increase $V_2$ by Ibin_2 is added. Therefore, the lithium ion battery 21 can be charged to such a level that the inter-terminal voltage thereof becomes close to Vsoc_max, compared with when the input upper-limit Ibin_lmt is set to Ibin_1.

The current control means 32 acquires an input/output ratio V by applying the detected temperature and SOC of the lithium ion battery 21 to the upper-limit map 41 which allocates an input/output ratio V corresponding to the temperature (which is divided in the range of 10° C. in FIG. 4) of the lithium ion battery 21 to each range of the SOC of the lithium ion battery 21 (in FIG. 4, SOC: a range of 30 to 70% is exemplified). Further, the current control means 32 sets the output upper-limit current Ibout_lmt and the input upper-limit current Ibin_lmt such that a ratio of the output upper-limit current Ibout_lmt to the input upper-limit current Ibin_lmt is not more than the acquired input/output ratio V.

Referring to FIGS. 5(a) to 5(c), an effect of reducing the necessary capacity of the capacitor 2 by setting the output upper-limit current Ibout_lmt and the input upper-limit Ibin_lmt such that the input/output ratio V is at most 0.8 will be described.

FIG. 5(a) shows the distribution of power supply by the lithium ion battery 21 and the capacitor 2 during the power running operation of the motor 5 and the distribution of power recovery by the lithium ion battery 21 and the capacitor 2 during the regenerative operation of the motor 5. In FIG. 5(a), "a1" indicates a case where the input upper-limit current Ibin_lmt and the output upper-limit current Ibout_lmt are set to a predetermined magnitude of 50, "b1" indicates a case where the input upper-limit current Ibin_lmt is set to 50 and the output upper-limit current Ibout_lmt is set to 60, and "c1" indicates a case where the input upper-limit current Ibin_lmt is set to 50 and the output upper-limit current Ibout_lmt is set to 80.

In a1, during the power running operation of the motor 5, the distribution ratio of power output from the lithium ion battery 21 and the capacitor 2 is 1:1 (=Sc1 (output of the capacitor 2):Sb1 (output of the lithium ion battery 21)). Further, during the regenerative operation of the motor 5, the distribution ratio of power recovered into the lithium ion battery 21 and the capacitor 2 is also 1:1 (=Gc1 (recovery of power into the capacitor 2):Gb1 (recovery of power into the lithium ion battery 21)).

Further, when the output upper-limit current Ibout_lmt is increased (from 50(a1) to 60(b1) to 80(c1)) while the input upper-limit current Ibin_lmt is maintained to 50, power output from the lithium ion battery 21 increases and the power output from the capacitor 2 decreases at the time of obtaining output power Pr during the power running operation of the motor 5. Therefore, the capacity of the capacitor 2 which is required for securing the output power Pr is reduced.

FIG. 5(b) shows changes in the capacity of the capacitor 2 which is required when the ratio of the output upper-limit current Ibout_lmt with respect to the input upper-limit current Ibin_lmt is increased. In FIG. 5(b), a2 corresponds to a1 of FIG. 5(a), b2 corresponds to b1 of FIG. 5(a), and c2 corresponds to c1 of FIG. 5(a).

In FIG. 5(b), as the output upper-limit current Ibout_lmt of the lithium ion battery 21 is increased, an amount of charge which needs to be secured in the capacitor 2 decreases from Cs1 to Cs2 then to Cs3. Therefore, the capacity including a capacitive component Cg1, which needs to be secured so as to recover the regenerative power of the motor 5, of the capacitor 2 decreases.

FIG. 5(c) shows changes in the total capacity of the capacitor 2 and the lithium ion battery 21 which is required when the ratio of the output upper-limit current Ibout_lmt with respect to the input upper-limit current Ibin_lmt is increased as shown in FIG. 5(a). In FIG. 5(c), a3 corresponds to a1 of FIG. 5(a) and a2 of FIG. 5(b), b3 corresponds to b1 of FIG. 5(a) and b2 of FIG. 5(b), and c3 corresponds to c1 of FIG. 5(a) and c2 of FIG. 5(b).

In FIG. 5(c), as the ratio of the output upper-limit current Ibout_lmt with respect to the input upper-limit current Ibin_lmt is increased, the volume of the capacitor 2 can be reduced from Mc1 to Mc2 then to Mc3. Therefore, the total volume of the volume (Mc1, Mc2, or Mc3) of the capacitor 2 and the volume (Mb1) of the lithium ion battery 21 can be reduced from (Mc1+Mb1) to (Mc2+Mb1) then to (Mc3+Mb1). Accordingly, the overall volume of the power supply device can be reduced, and a reduction in the weight of the power supply device can be achieved.

In this embodiment, the lithium ion battery is exemplified as the secondary battery of the invention, and the electric double-layer capacitor is exemplified as the capacitor of the invention. However, the secondary battery and the capacitor of the invention are not limited to the lithium ion battery and the electric double-layer capacitor, respectively, but other secondary batteries and capacitors may be used.

Further, it has been described that the ratio of the input upper-limit current Ibin_lmt to the output upper-limit current Ibout_lmt is changed depending on the temperature of the lithium ion battery. However, even when the ratio of the input upper-limit current Ibin_lmt to the output upper-limit current Ibout_lmt of the lithium ion battery is set without considering the temperature of the lithium ion battery, it is possible to obtain the same effect of the invention.

What is claimed is:

1. A power supply device for vehicles, which is mounted on a vehicle, has an output unit connected to a motor which is rotated with a drive wheel, supplies drive power to the motor during a power running operation of the motor, and recovers regenerative power of the motor during a regenerative operation of the motor, the power supply device comprising:
   a fuel cell which is connected to the output unit;
   a capacitor which is connected in parallel to the fuel cell;
   a secondary battery which is connected in parallel to the capacitor through a current limiting means; and
   a current control means which limits an output current from the secondary battery to at most a predetermined output upper-limit current in the case where an electrical power is supplied to the motor from the secondary battery during the power running operation of the motor; and limits an input current to the secondary battery to at most an input upper-limit current smaller than the output upper-limit current through the current limiting means in the case where the regenerative power of the motor is recovered into the secondary battery during the regenerative operation of the motor.

2. The power supply device according to claim 1 including a fuel cell accessory unit which is connected between the secondary battery and the current limiting means and is driven by an electrical power supplied from the secondary battery to operate the fuel cell.

3. The power supply device according to claim 1 further including a temperature detecting means which detects a temperature of the secondary battery, wherein as the temperature of the secondary battery increases, the current limiting means reduces a ratio of the input upper-limit current with respect to the output upper-limit current.

4. The power supply device according to claim 3 including a fuel cell accessory unit which is connected between the secondary battery and the current limiting means and is driven by an electrical power supplied from the secondary battery to operate the fuel cell.

* * * * *